United States Patent
Laurell et al.

(10) Patent No.: US 10,066,529 B2
(45) Date of Patent: Sep. 4, 2018

(54) PRESSURE DIFFERENTIATED EXHAUST AFTERTREATMENT DEVICE

(71) Applicant: VOLVO CAR CORPORATION, Gothenburg (SE)

(72) Inventors: Mats Laurell, Gothenburg (SE); Jan Dahlgren, Torslanda (SE); Peter Sandberg, Gothenburg (SE); Marie Stenfeldt, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 415 days.

(21) Appl. No.: 14/746,537

(22) Filed: Jun. 22, 2015

(65) Prior Publication Data

US 2015/0377111 A1    Dec. 31, 2015

(30) Foreign Application Priority Data

Jun. 27, 2014   (EP) .................................. 14174794

(51) Int. Cl.
| | |
|---|---|
| *F01N 3/28* | (2006.01) |
| *F01N 3/10* | (2006.01) |
| *F01N 3/20* | (2006.01) |
| *F01N 13/00* | (2010.01) |

(52) U.S. Cl.
CPC ........... *F01N 3/2892* (2013.01); *F01N 3/106* (2013.01); *F01N 3/2066* (2013.01); *F01N 3/2803* (2013.01); *F01N 13/009* (2014.06); *F01N 13/0097* (2014.06); *F01N 2240/20* (2013.01); *F01N 2470/18* (2013.01); *F01N 2610/02* (2013.01); *F01N 2610/1453* (2013.01); *Y02A 50/2325* (2018.01); *Y02T 10/24* (2013.01)

(58) Field of Classification Search
None
See application file for complete search history.

(56) References Cited

U.S. PATENT DOCUMENTS

| | | |
|---|---|---|
| 8,607,551 B2 | 12/2013 | Nagaoka et al. |
| 2011/0219755 A1 | 9/2011 | Mueller-Haas |

FOREIGN PATENT DOCUMENTS

| | | | |
|---|---|---|---|
| DE | 102005012066 A1 | 9/2006 | |
| EP | 2388451 A1 | 11/2011 | |
| WO | 2013121112 A1 | 8/2013 | |
| WO | WO-2013121112 A1 * | 8/2013 | ......... B01D 53/9468 |

OTHER PUBLICATIONS

Extended European Search Report dated Jan. 7, 2015, Application No. 14174794.9-1603, Applicant Volvo Car Corporation, 6 Pages.

* cited by examiner

*Primary Examiner* — Walter D. Griffin
*Assistant Examiner* — Jelitza M Perez
(74) *Attorney, Agent, or Firm* — Brooks Kushman P.C.

(57) ABSTRACT

The disclosure relates to an exhaust gas aftertreatment device for purification of exhaust gas emissions. The exhaust gas aftertreatment device is arranged in an exhaust gas passage subsequently of an internal combustion engine and includes an encapsulating portion, a first catalytic substrate and a second catalytic substrate. The second catalytic substrate may be of SCR type. The exhaust gas aftertreatment device includes a reductant injecting device, a pipe and an obstructing portion, where the reductant injecting device is arranged such that reductant is injectable within the pipe and the exhaust gas flow through the pipe can be controlled by the obstructing portion.

5 Claims, 5 Drawing Sheets

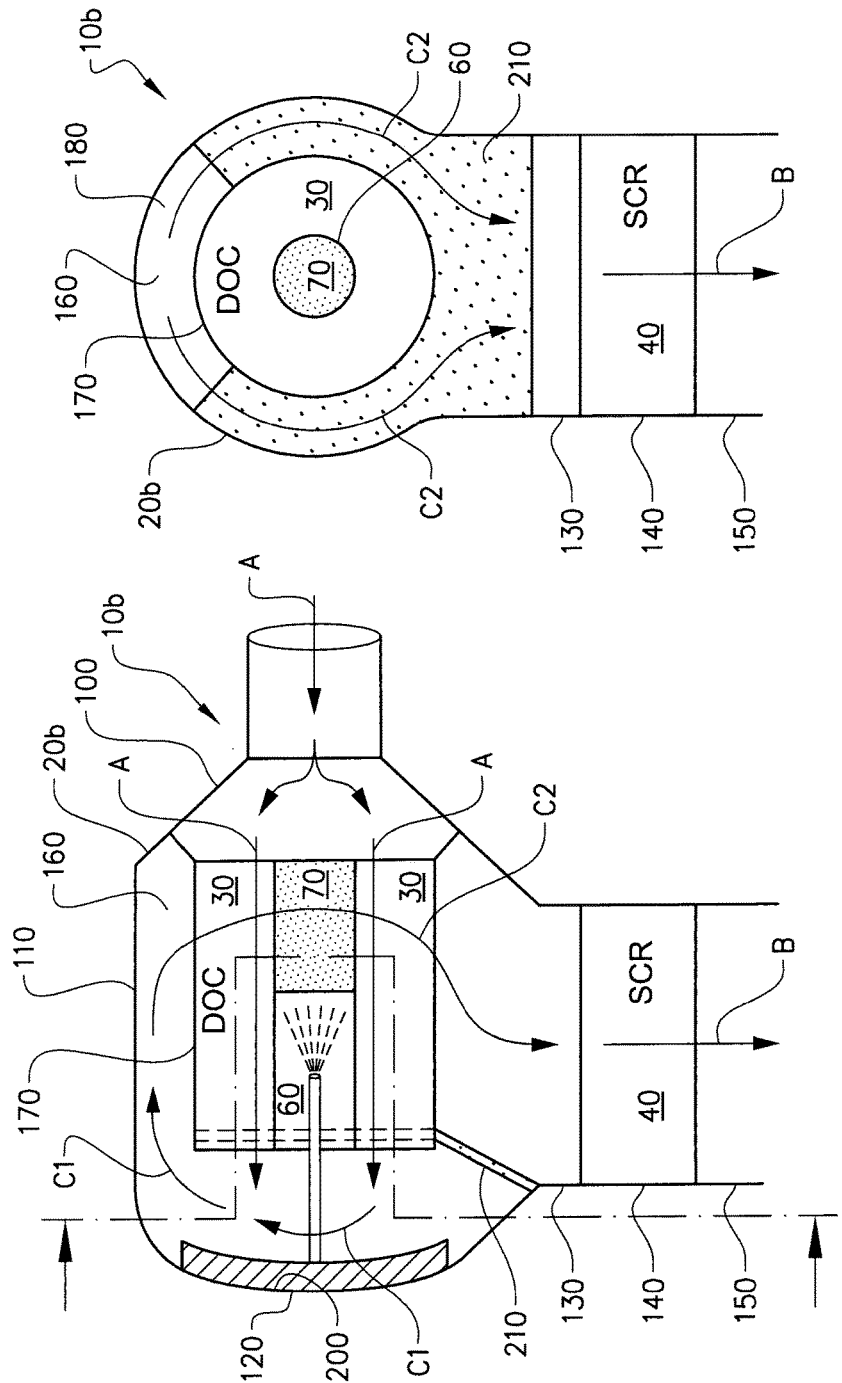

PRESSURE DIFFERENTIATED EXHAUST AFTERTREATMENT DEVICE

CROSS-REFERENCE TO RELATED APPLICATIONS

This application claims foreign priority benefits under 35 U.S.C. § 119(a)-(d) to European patent application number EP 14174794.9, filed Jun. 27, 2014, which is incorporated by reference in its entirety.

TECHNICAL FIELD

The present disclosure relates to an exhaust gas aftertreatment device for an internal combustion engine. The disclosure can be applied in passenger cars as well as in heavy duty vehicles such as trucks or buses.

BACKGROUND

In order to fulfill current stringent emission legislation more or less all vehicles with internal combustion engines are provided with an exhaust gas aftertreatment device comprising at least one catalytic converter with at least one catalytic substrate. A catalytic converter substrate generally comprises a channeled structure which exhaust gases can pass through while being exposed to the large surface area of the catalytic substrate. The channels of the substrates may be fluidly connected by perforating holes or like allowing gases to pass between adjacent channels. This enables gas to diffuse through the substrate structure. For petrol engines the most frequently used catalytic converters are of Three Way Catalyst (TWC) type, while catalytic converters of Diesel Oxidation Catalyst (DOC) type and/or Lean NOx Trap (LNT) type are the most frequently used converters for diesel engines. The TWC or the DOC/LNT may be supplemented by a converter with Selective Catalytic Reduction (SCR) functionality for improved NOx reduction. Typically, when using a catalytic converter of SCR type a liquid or gaseous reductant is added to the exhaust gas emission flow before the exhaust gases enters the catalytic converter of SCR type. The addition of reductant enables the catalytic reduction were NOx is reduced to diatomic nitrogen, N2, and water, H2O.

Catalytic converters combining the functionalities of more than one type of catalytic converter in one catalytic converter also exist.

Combining more than one catalytic converter can be problematic since exhaust gas aftertreatment devices often are associated with design restrains due to the limited available space in the engine compartment. Thus, small exhaust gas aftertreatment devices are preferred from an engine packaging perspective, but small exhaust gas aftertreatment devices usually means that the flow distance between the inlet and the catalytic substrates of the catalytic converter is limited. Limited distance means that the time and distance during which mixing of the exhaust gas emissions can occur is limited. Insufficient mixing of the exhaust gas emissions gives inhomogeneous exhaust gas emission mixture. This might e.g., be problematic for emission gas sensors, arranged in the exhaust gas emission flow, to work properly and give accurate emission measurements.

Other problematic areas for catalytic converters are high back pressure and insufficient heating. High back pressure implies significant exhaust gas flow resistance. This is negative for the efficiency of the combustion engine resulting in a decrease of power output. Compensation of such decrease in power output leads to an increase in fuel consumption. If there is a difference in back pressure between two possible flow paths the flow through the flow path with lowest backpressure will be larger than the flow through the flow path with the higher backpressure. The flow ratio will be in proportion to the difference in back pressure. Heating of the catalytic converter is crucial since the catalytic converter is most effective at relatively high temperatures. Thus, it is desirable that the catalytic converter reaches its optimum operation temperatures as soon as possible and that the catalytic converter stays warm during operation.

Insufficient mixing of the exhaust gas emissions are of particular interest if a catalytic converter with a catalytic substrate with SCR functionality is used. For catalytic converters with SCR functionality, a liquid or gaseous reductant such as e.g., urea is introduced in the exhaust gas emission flow in order for the reductant and exhaust gas emissions to mix before reaching the substrate with SCR functionality. When a liquid reductant is used it is also desirable that the liquid reductant is evaporated. Consequently, sufficient mixing and reductant evaporation is important for the substrate with SCR functionality to work properly.

U.S. Pat. No. 8,607,551 discloses an exhaust gas purifier and system for exhaust gas purification including an NOx catalyst of SCR type and a Catalyst Supported diesel particulate Filter (CSF) arranged in series, and being dispensed in an exhaust passage of an internal combustion engine. The purifier includes a passage for urea supply having a hydrolysis catalyst therein and a passage for hydrocarbon supply having an oxidation catalyst therein. Prior art, described in FIG. 4, discloses a DOC, a CSF and a catalyst of SCR type is arranged in series. A urea injection valve is arranged in a pipe upstream of the catalyst of SCR type. Neither in U.S. Pat. No. 8,607,551 nor prior art therein provides sufficient mixing and reductant (urea) evaporation characteristics and respective design are limited in regards of engine compartment packaging requirements.

Thus, there is a need for further improvements.

SUMMARY

An object of the present disclosure is to provide a compact exhaust gas aftertreatment device, in particular a compact two catalytic converter exhaust gas aftertreatment device with improved catalytic properties due to improved mixing and reductant evaporation characteristics. By arranging two catalytic converters in series, wherein the second catalytic converter is of SCR type, and applying a pressure differential in connection to the injection of reductant a compact exhaust gas aftertreatment device with desired shape and improved mixing and reductant evaporation characteristics is provided.

Further advantages and advantageous features of the present disclosure are disclosed in the following description and in the dependent claims.

Another object of the present disclosure is to provide a manufacturing method of such exhaust gas aftertreatment device.

As is known to a person skilled in the art a catalytic converter may comprise more than one catalytic substrate. E.g., catalytic converters of TWC type generally comprise two substrates. It is also possible to use a single catalytic substrate with coating providing two different functionalities, such as the functionality of DOC type and of LNT type. This is not part of the present disclosure per se and for clarity and simplicity reasons hereinafter the respective catalytic converter of the present disclosure is simply referred to as a first and a second catalytic substrate. With respective first and second catalytic substrate catalytic converters possibly comprising more than one substrate are considered to be included.

The present disclosure can be used both in vehicles with spark ignited engines and in vehicles with compression ignited engines. If the exhaust gas aftertreatment device is used in a vehicle with a diesel engine the first catalytic substrate may be of Diesel DOC type or LNT type. If the exhaust gas aftertreatment device is used in a vehicle with a gasoline engine, or any other spark ignited fuels such as e.g., an ethanol based fuel, the first catalytic substrate may be of TWC type. The technical aspects of DOC, TWC and LNT catalyst are known to a person skilled in the art, as is the advantages and disadvantages with respective type of catalyst. The type of catalytic converter used as first catalytic converter is not part of the disclosure per se.

Thus, as will be apparent throughout the description of the present disclosure, when referring to said first catalytic substrate what might be intended is a catalytic converter of TWC type, thus actually comprising of two catalytic substrates.

Exhaust gas aftertreatment devices for purification of exhaust gas emissions for vehicles are generally arranged in exhaust gas passages subsequently of an internal combustion engine. As the exhaust gas emissions of said internal combustion engine are discharged through said exhaust gas passage they enter said exhaust gas aftertreatment device. The exhaust gas passage is generally enclosed by an encapsulating portion enclosing of the exhaust gas aftertreatment device.

The exhaust gas aftertreatment device of the present disclosure comprises said first catalytic substrate and said second catalytic substrate, wherein said first catalytic substrate is arranged upstream of said second catalytic substrate. The first and second catalytic substrates are arranged such that respective catalytic substrate covers a majority of respective flow cross sectional area of said exhaust gas passage. The whole cross sectional area of the catalytic converter may be covered, but as will be apparent according to some embodiments of the present disclosure part of the cross sectional area may be occupied by e.g., a reductant injecting device or a reductant injecting pipe. Part of the cross sectional area may also be used in order to provide exhaust gas circulation.

The first and second catalytic substrates are extending a respective length in a flow direction of said exhaust gas passage such that an exhaust gas emission flow discharged from said internal combustion engine flows through the length of said first catalytic substrate and subsequently through the length of said second catalytic substrate.

According to the present disclosure the second catalytic substrate may be of Selective Catalytic Reduction (SCR) type. However, the second catalytic substrate may also be of other design where injection of a liquid or gaseous fluid with reductive, or other chemical property, is desired.

Thus, according to the present disclosure the exhaust gas aftertreatment device additionally comprises a reductant injecting device, capable of injecting liquid or gaseous reductant into the exhaust gas aftertreatment device. The reductant injecting device may comprise at least an injector nozzle and an injector conduit arranged such that the injector conduit extends through the encapsulating portion of the exhaust gas aftertreatment device. The injector nozzle, arranged to the part of the reductant conduit extending into the exhaust gas aftertreatment device, is provided such that reductant can be added to the exhaust gas flow. The reductant injecting device may be arranged to a reductant tank and to means suitable for providing reductant from the reductant tank to the reductant injecting device. The functionality of an SCR catalyst and a reductant injecting device as disclosed above are considered to be known to a person skilled in the art and are not part of the present disclosure per se.

According to the present disclosure a pipe extends in said flow direction of said first catalytic substrate such that said pipe provides a passage through said first catalytic substrate. Said pipe comprises an obstructing portion arranged such that said obstructing portion covers the cross sectional area of said pipe. The obstructing portion is provided such that a difference in back pressure is obtainable between said pipe and said first catalytic substrate. The pressure difference obtained provides different flow rates for the exhaust gas flow through the first catalytic substrate and for the exhaust gas flow through the pipe. Said reductant injecting device is extending through said encapsulating portion and into said pipe such that reductant is injectable within said pipe.

In order for a catalytic substrate of SCR type to efficiently purify exhaust gases suitable relation between injected reductant and exhaust gases, sufficient evaporation of injected reductant and good mixing of evaporated reductant and exhaust gases are required. The mixing and evaporation properties are favored by turbulent exhaust gas flow and maintained high exhaust gas temperature. Also, the longer the time and the distance during which the exhaust gas and the injected reductant can mix is the better mixing and reductant evaporation is obtained.

By arranging the reductant injecting device within said pipe the distance from where the reductant is injected to the subsequently arranged catalyst of SCR type will be prolonged which will be beneficial for mixing and reductant evaporation.

Thus, according to an embodiment of the present disclosure said reductant injection device is arranged such that said reductant is injectable downstream of said obstructing portion. As has been stated, injecting the reductant downstream of said obstructing portion, wherein said obstructing portion is arranged in a pipe, enables that reductant is injectable further away from the second catalytic converter than otherwise would be possible.

According to one embodiment of the present disclosure said pipe is arranged centrally of said first catalytic substrate. Arranging the pipe centrally of said first catalytic substrate may be advantageous from a manufacturing perspective. However, it is also possible to arrange the pipe radially displaced. Depending on the design of the exhaust as aftertreatment device displacing the pipe radially may be used in order to improve the mixing properties. Since the exhaust gas flow through the first catalytic substrate and the pipe will be different, by displacing the pipe radially it is possible to obtain a swirling, turbulent flow motion after the pipe and the first catalytic converter which is beneficial for the mixing characteristics.

The obstructing portion may be of different configurations. According to one embodiment of the present disclosure said obstructing portion has a higher back pressure than said first catalytic substrate. According to an embodiment of the present disclosure the difference in back pressure between the pipe, provided by the higher back pressure of the obstructing portion provided in the pipe, and the first catalytic substrate may be configured such that approximately 10% of the exhaust gas mass flow flows past the obstructing portion, not taking the smaller cross sectional area of the obstructing portion in consideration. According to another embodiment as low as 2% of the mass flow flows past the obstructing portion. Depending on current exhaust gas aftertreatment device design the obstructing portion may have anything from merely noticeable gas flow obstructing effect to being completely impermeable. Applying a completely impermeable, or at least significantly flow reducing obstructing portion, may be an advantageous approach with high controllability of the mixing and evaporative characteristics within the pipe.

According to one embodiment of the present disclosure said exhaust gas flow enters said exhaust gas aftertreatment device in a first flow direction and is discharged from said exhaust gas aftertreatment device in a second flow direction. Arranging the exhaust gas aftertreatment device such that the exhaust gases are discharged in a direction turned approximately 90° in relation to the direction in which the exhaust gases enters the exhaust gas aftertreatment device is beneficial from a vehicle packaging perspectives.

According to another embodiment of the present disclosure said pipe is circumferentially perforated by radial holes along at least a portion of the length of said pipe such that exhaust gas emission can flow through provided perforation. Depending on prevailing pressure ratio between the inside and outside of the pipe, the perforation of said pipe may enable exhaust gases to pass out of the pipe and to said first catalytic substrate or pass from the said first catalytic substrate into the pipe. As previously stated, the channels of a substrate may be fluidly connected such that exhaust gases passing through said perforation of said pipe may continue to diffuse in the substrate structure. Perforation of said pipe, enabling that exhaust gas may pass in or out of said pipe, can be used to improve the mixing characteristics of the exhaust gas aftertreatment device. The radial holes may according to another embodiment of the present disclosure continue through the substrate.

Different examples of how the arrangement of said obstructing portion, the arrangement of said reductant injecting device, perforation of said pipe and the exhaust gas aftertreatment device design can be used in order to obtain required mixing and reductant evaporation characteristics will be disclosed in the detailed description.

According to another embodiment of the present disclosure said encapsulating portion comprises, in the order of the exhaust gas flow:
an inlet portion,
a first substrate outer encapsulating portion,
a turnaround surface portion,
a mixing area encapsulating portion,
a second substrate encapsulating portion, and
an outlet portion.

Thus, the exhaust gas flow discharged from the internal combustion engine initially enters said exhaust gas aftertreatment device at said inlet portion in said first flow direction, where after the exhaust gases passes the first substrate outer encapsulating portion comprising the first catalytic substrate and enters the turnaround surface portion. Subsequently the exhaust gas flow passes the mixing area encapsulating portion into the second substrate encapsulating portion comprising the second substrate. At said mixing area a homogeneous exhaust gas and evaporated reductant mix is obtained. Finally the purified exhaust gas is discharged from said exhaust gas aftertreatment device at said outlet portion in said second flow direction. Said turnaround surface portion provides a turnaround surface provided between said first catalytic substrate and said second catalytic substrate. At said turnaround surface the exhaust gas flow may be redirected in some direction in order for the exhaust gas aftertreatment device to comply with prevailing packaging limitation, e.g., such that said exhaust gas flow is redirected from said first flow direction to said second flow direction. Thus, such arrangement is advantageous from a packaging perspective, wherein said first flow direction may be perpendicular or near perpendicular to said second flow direction whereby the exhaust gas aftertreatment device can be arranged in a 90° angled exhaust gas passage.

Depending on the packaging requirements it is also possible that other angulations of the exhaust gas aftertreatment device are most advantageous.

The positioning of the reductant tank may be adapted in order to comply with current engine design. Also the reductant injecting device may be arranged in order to comply with current engine design, and in order to provide sufficient reductant injection pressure it may be advantageous to position the reductant tank and the reductant injecting device close to each other.

Depending on the vehicle design and engine packaging requirements it may be beneficial to position the reductant tank and the reductant injecting device either before said exhaust gas aftertreatment device, or at least such that said reductant injecting device is extending through said encapsulating portion upstream of said first catalytic substrate, or after said exhaust gas aftertreatment device, or at least such that said reductant injecting device is extending through said encapsulating portion downstream of said first catalytic substrate.

Hence, according to one advantageous embodiment of the present disclosure said reductant injecting device is arranged such that it extends through said turnaround surface of said encapsulating portion at a position downstream of said first catalytic substrate. According to another embodiment of the present disclosure said reductant injecting device is arranged such that is extends through said encapsulating portion at said first substrate outer encapsulating portion at a position downstream of said first catalytic substrate.

According to the embodiment of the present disclosure for which the reductant injecting device extends through said outer encapsulating portion at a position downstream of said first catalytic substrate the reductant injecting device may additionally extend through said obstructing portion. This enables that reductant is injectable within said pipe downstream of said obstructing portion.

The reductant may be injected either substantially in said first flow direction or in a flow direction substantially opposite to said first flow direction.

Injection of reductant opposite the flow direction may be advantageous for the mixing since the injected reductant will have more momentum. However, installation restraints may limit the injection to be performed in parallel to the flow direction. Thus, what injection direction that is most suitable for respective embodiment of the present disclosure is dependent on current exhaust gas aftertreatment device design. The injection direction is one of the many disclosed properties that can be adapted such that sufficient mixing and evaporation characteristics are obtained.

According to another embodiment of the present disclosure said turnaround surface is provided with a porous material. Implementing such porous material may be beneficial due to many different causes. The reductant is injected upstream of said porous material and consequently unevaporated reductant can be absorbed by the porous material and retained until it is fully evaporated. The porous material may consist of a mesh structure, such as for a catalytic converter substrate, or be of any other suitable structure. According to one embodiment of the present disclosure said porous material is made of a heat conductive material such that said porous material is usable as a heater element, which improves the ability to evaporate not evaporated reductant even more. According to one embodiment said porous material is provided with a catalytic surface.

The present disclosure also comprises a vehicle comprising the exhaust gas aftertreatment device of the present disclosure and methods for manufacturing said first catalytic substrate, comprising said obstructing portion, of said present disclosure.

According to one embodiment of a method for manufacturing a catalytic substrate comprising said obstructing portion is manufactured by using extrusion. Extrusion and cutting catalytic substrates generally comprises the method steps of:
- mixing a substrate material, wherein said substrate material is suitable for forming a catalytic substrate structure,
- extruding said substrate material through a die, wherein said die is of a suitable shape such that a mesh structure, honeycomb structure or other desired structure is formed,
- removing liquid from said extruded substrate material by suitable means such as by drying said extruded substrate material by applying heat,
- cutting said extruded substrate material such that a substrate of suitable length is formed,
- performing heat treatment of said cut substrate in an oven or like such that said cut substrate gets hard and brittle, and
- applying a catalytic coating to said cut substrate, wherein said catalytic coating is applied by suction, spraying or by dipping said substrate in said catalytic coating.

Said catalytic coating comprises base metals and noble metals and have catalytic and surface enlarging properties.

Extrusion of catalytic substrates according to the method steps as described above are well known and are not part of the disclosure per se. The method steps can also be performed in a somewhat different manner with the same result.

However, according to the disclosure the method additionally comprises the steps of:
- drilling a hole in parallel with an intended flow direction of said catalytic substrate such that the hole extends through said catalytic substrate,
- arranging a pipe within said drill hole, and
- arranging an obstructing portion within said pipe such that said obstructing portion covers the cross sectional area of said pipe such that a difference in back pressure is obtainable between said pipe and said first catalytic substrate.

The latter method may also be performed without arranging a pipe within said drill hole. Inserting a pipe is optional since the drilling itself will form a channel in the substrate. However, a pipe may be heated by the hot exhaust gases, thus inserting a pipe may be advantageous from a reductant evaporation embodiment.

According to an embodiment of the present disclosure said drill hole is arranged substantially centrally in said catalytic substrate. This manufacturing method of said first catalytic substrate comprises an obstructing portion if ceramic substrates are used. Extrusion of ceramic substrates is well known and by selecting suitable obstructing portion and pipe, and drilling a hole in said ceramic substrate suitable for said pipe, a first catalytic substrate of the present disclosure can easily be obtained.

According to another embodiment of a method for manufacturing a catalytic substrate comprising said obstructing portion the method comprises the step of:
- extruding a substrate with two different densities such that an inner portion in an intended flow direction, running from an intended flow entering side to an intended flow exiting side, of the extruded substrate is more dense than an outer portion in an intended flow direction, also running from an intended flow entering side to an intended flow exiting side, of the extruded substrate, such that said inner portion is provided with an higher back pressure than said outer portion, and
- drilling a hole in said inner portion, such that said inner portion forms an obstructing portion extending at least a part of the length of said catalytic substrate, in parallel with an intended flow direction of said catalytic substrate.

Such extrusion may be performed simultaneously as a pipe, separating said two substrate portions with different substrate density, is arranged inside said extruded substrate.

In this manufacturing method of said first catalytic substrate the denser portion of the extruded substrate forms an obstructing portion and the less dense portion of the extruded substrate forms a portion which may be provided with a catalytic coating.

According to one embodiment of a method for manufacturing a catalytic substrate comprising said obstructing portion the method comprises the step of:
- welding an obstructing portion within a ring shaped catalytic substrate such that said obstructing portion seals against an inner peripheral surface of said ring shaped catalytic substrate.

This manufacturing method of said first catalytic substrate comprises an obstructing portion of the present disclosure if metallic substrates are used. Metallic ring catalysts are commercially available and by welding a suitable obstructing portion within such ring catalyst a first catalytic substrate of the present disclosure can easily be obtained.

As is apparent for the person skilled in the, as long as not contradicting different embodiments presented can be combined without departing from the scope of the disclosure.

BRIEF DESCRIPTION OF THE DRAWINGS

The various embodiments of embodiments herein, including its particular features and advantages, will be readily understood from the following detailed description and the attached drawings.

FIGS. 2A and 2B disclose the second embodiment of an exhaust gas aftertreatment device according to the present disclosure where flow of exhaust gas is indicated;

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
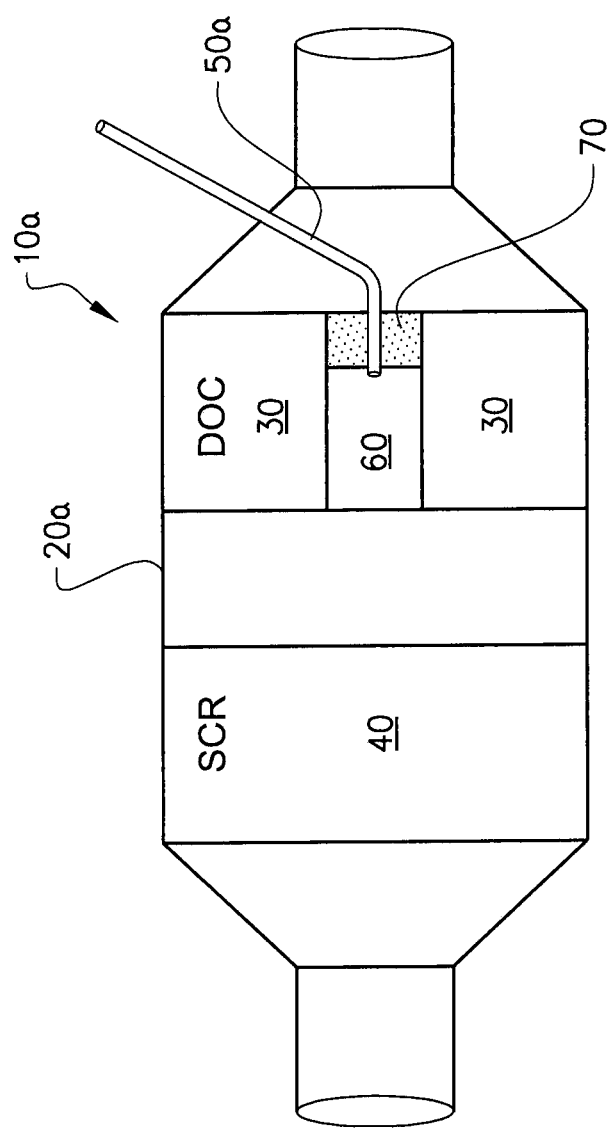
FIG. 1 discloses a first embodiment of an exhaust gas aftertreatment device according to the present disclosure.

FIG. 1 discloses a first embodiment of an exhaust gas aftertreatment device 10a, comprising a first catalytic substrate 30 of DOC type and a second catalytic substrate 40 of SCR type. Centrally of said first catalytic substrate 30 a pipe 60 is arranged, and in the upstream part of the said pipe 60 an obstructing portion 70 is arranged. The exhaust gas aftertreatment device 10a is encapsulated by an encapsulating portion 20a, wherein a reductant injecting device 50a is extending through said encapsulating portion 20a at a part of the encapsulating portion 20a provided upstream of said first catalytic substrate 30. Said reductant injecting device 50a also extends through said obstructing portion 70 such that reductant is injectable inside said pipe 60 and downstream of said obstructing portion 70.

By introducing said pipe 60, and injecting the reductant within said pipe 60 instead of injecting the reductant at a position provided downstream of said first catalytic substrate 30, the distance from where the reductant is injected to said second catalytic substrate 40 will be prolonged. This means that the injected reductant will also be exposed to hot exhaust gases for a longer period of time before reaching the second catalytic substrate 40 of SCR type which will improve the evaporation properties of said reductant and also that injected reductant and exhaust gases will be able to mix during a longer period of time. A homogenous, balanced mix between exhaust gases and fully evaporated reductant is desirable to obtain the best possible catalytic effect by a catalyst of SCR type.

The obstructing portion 70 has a higher backpressure than said first catalytic substrate 30. In order for the first catalytic substrate 30 to be efficient it is desirable that the exhaust gases spends as long time as possible within the substrate and thereby is exposed to as large catalytic surface as possible during the passage of the substrate. It is also desirable that that the backpressure of said first catalytic substrate 30 is as low as possible since the engine efficiency is dependent on the gas flow through the exhaust system. Thus, there is trade-off between catalytic efficiency and backpressure of the first catalytic substrate.

In order for injected reductant and exhaust gases to mix sufficiently, and for the reductant to be sufficiently evaporated, the exhaust gas flow and the reductant injection rate has to be considered together. By adding the obstructing portion 70, for which the backpressure is set independently of having to consider catalytic efficiency, it is possible to configure the backpressure, hence the exhaust gas flow, such that the gas flow through the obstructing portion 70 and the reductant injection rate provides sufficient mixing and evaporation.

FIG. 2A shows an embodiment of the exhaust gas aftertreatment device 10b, comprising an encapsulating portion 20b, a first catalytic substrate 30 and a second catalytic substrate 40. Said encapsulating portion 20b is divided in an inlet portion 100, a first substrate outer encapsulating portion 110, a turnaround surface portion 120, a mixing area encapsulating portion 130, a second substrate encapsulating portion 140 and an outlet portion 150. Said exhaust gas aftertreatment device 10b is intended to be provided in an exhaust passage downstream of an internal combustion engine such exhaust gases discharged from said internal combustion engine enters the exhaust gas aftertreatment device 10b at an inlet portion 100. The exhaust gases enters said exhaust gas aftertreatment device in a first flow direction A. After passing said inlet portion 100 the exhaust gases passes the subsequently arranged first catalytic substrate 30 comprising the pipe 60 with the obstructing portion 70 as described in connection to FIG. 1. On the outside of said first catalytic substrate 30, which is covered by a first substrate inner encapsulating portion 170 which may be made of a metallic material, an exhaust gas circulating space 160 is provided. Said exhaust gas circulating space 160 is in turn delimited by said first substrate outer encapsulating portion 110.

The exhaust gases passes said first catalytic substrate 30, said pipe 60 and said obstructing portion 70 in the first flow direction A. Thereafter the exhaust gases reach said turnaround surface portion 120, provided such that a turnaround surface 200 is formed whereby the exhaust gas flow is redirected. Said turnaround surface is provided such that the exhaust gas flow will be redirected from said first flow direction A in a redirecting movement C1-C2 to a first circulating flow direction C1.

Said obstructing portion is arranged in the upstream part of said pipe 60 such that a reductant injecting device 50b is provided. Said reductant injecting device 50b is provided such that reductant is injectable within said pipe 60 downstream of said obstructing portion 70. Said reductant injecting device 50b is extending through said turnaround surface 200, substantially opposite the first flow direction A. Additionally, said reductant injecting device 50b is provided such that reductant is injected in a direction substantially opposite to said first flow direction A. By providing said reductant injecting device 50b inside said pipe 60 downstream of said obstructing portion 70 it is possible to inject reductant further upstream from the second catalytic substrate 40, which is beneficial for the mixing and reductant evaporation characteristics.

Said turnaround surface 200 is additionally provided with a porous material 220a. Providing said porous material 220a downstream of said reductant injecting device 50b enables that unevaporated reductant is captured and retained in said porous material 220a. While retained in said porous material 220a the unevaporated reductant will be exposed to hot exhaust gases until fully evaporated. Said porous material 220a can also be configured in order to protect said turnaround surface from corrosion by preventing unevaporated reductant from reaching said turnaround surface 200.

According to the embodiment of the disclosure disclosed in FIG. 2a between said turnaround surface portion 120 and said mixing area encapsulating portion 130 a guiding means 210 is provided. Said guiding means may at least partly seal against the downstream edge of the first substrate inner encapsulating portion 170 of said first catalytic substrate 30 and against the encapsulating portion 20b. Circumferentially said guiding means 210 covers a section of the circumference of said first catalytic surface such that a circulating passage 180 is formed where the redirected exhaust gas flow can circulate in said redirecting movement C1-C2. Said guiding means 210 provides that the at least a part of the exhaust flow is redirected and circulated in said redirecting movement C1-C2.

Referring now to FIG. 2B, showing a cross sectional view of the embodiment of the exhaust gas aftertreatment device 10b shown in FIG. 2A. The redirected exhaust gases enters the exhaust gas circulating space 160 in said circulating first flow direction C1, wherein said exhaust gas circulating space 160 is provided such that said exhaust gases pursues said redirecting movement C1-C2 in a second circulating direction C2. Thus, the exhaust gas flow will pass on the outside of said first catalytic substrate 30 when circulating in the second circulating direction C2.

Exhaust gas aftertreatment devices, and associated components, generally have a relative high temperature since being continuously exposed to hot exhaust gases. Catalytic converters generally works more efficiently at higher temperatures, thus maintained high temperature is beneficial for the emission purifying effect of the catalytic substrate. However, since the exhaust gas aftertreatment device has a higher temperature than the surroundings the outside of the exhaust gas aftertreatment devices 10b, thus the encapsulating portion 20b, is continuously cooled.

By directing hot exhaust gases in said redirecting movement C1-C2 in said exhaust gas circulating space 160 the first catalytic substrate 30 is not in direct contact with the first substrate outer encapsulating portion 110. Instead flowing hot exhaust gases will separate the first substrate outer encapsulating portion 110 from the first catalytic substrate 30. The temperature of the flowing hot exhaust gases, flowing past said first substrate outer encapsulating portion 110, is lowered due to the heat exchange with the surroundings. The first catalytic substrate 30 is continuously heated by hot exhaust gases passing through said first catalytic substrate 30, and to some extent also heated by the exhaust gases passing the first catalytic substrate 30 on the outside.

After passing the outside of the first catalytic substrate in said redirecting movement C1-C2 the exhaust gases subsequently enters said mixing area encapsulating portion 130. At said mixing area encapsulating portion 130 additional mixing of the exhaust gases are provided such that the a homogenous exhaust gas mix is provided before reaching said second substrate encapsulating portion 140 where the second catalytic substrate 40 is provided. A homogenous exhaust gas mix is beneficial for the catalytic conversion properties of the second catalytic substrate 40. The exhaust gases subsequently flow through said second catalytic substrate 40 and to said outlet portion 150 in a second flow direction B.

Figure 3B:
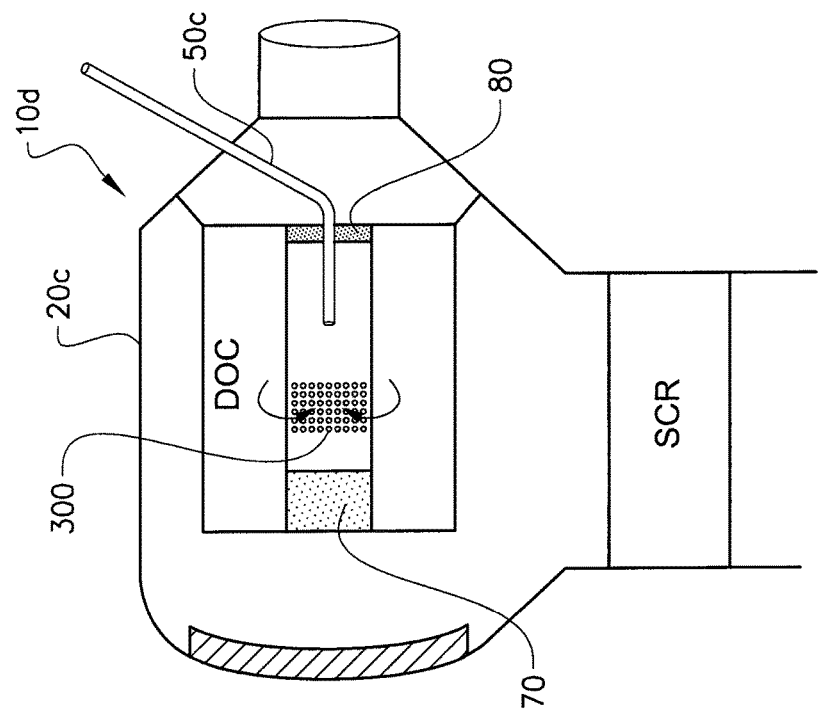
FIGS. 3A and 3B disclose different embodiments of exhaust gas aftertreatment devices according to the present disclosure.
Figure 3A:
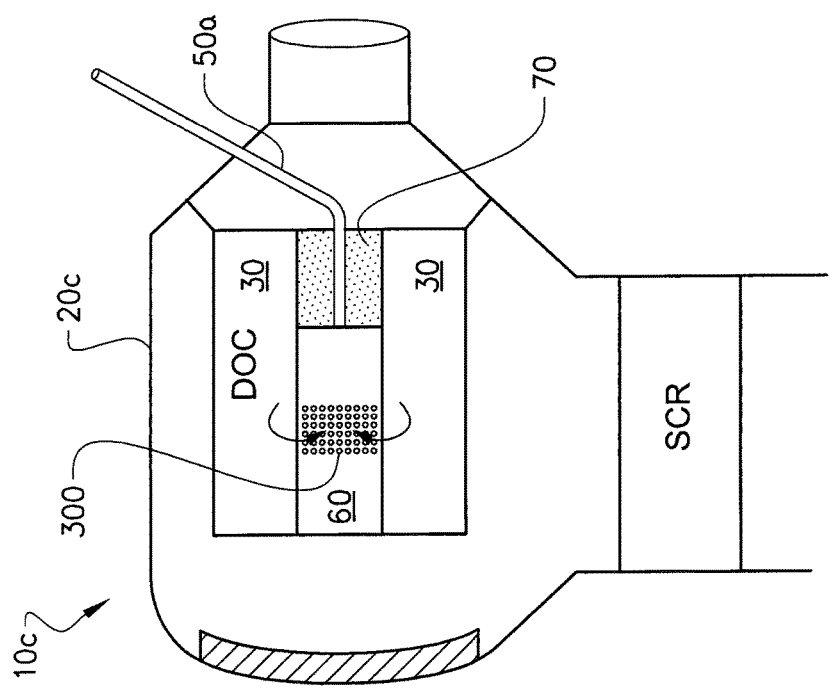

FIGS. 3A and 3B disclose two different embodiments of exhaust gas aftertreatment devices 10c; 10d according to the present disclosure. The embodiment of the exhaust gas aftertreatment device 10c of FIG. 3A is similar to the embodiment of the exhaust gas aftertreatment device of FIG. 2A with a few exceptions.

The embodiments of the disclosure disclosed in FIG. 3A disclose that the reductant injecting device 50a is provided such that it extends through said encapsulating portion 20c upstream of said first catalytic substrate 30 and further through said obstructing portion 70, such that reductant is injectable within the pipe 60. Additionally, said pipe 60 is provided with perforations such that a perforated section 300 of said pipe 60 is formed. Said perforated section 300 enables exhaust gases to pass through a lateral surface of said pipe 60. Depending on the pressure difference and respective exhaust gas flow of the pipe 60 and of said first catalytic substrate 30 exhaust gases either pass said lateral surface from said first catalytic substrate 30 into said pipe 60 or from said pipe 60 into said first catalytic substrate 30. Depending on current exhaust gas aftertreatment device design such perforated section 300 can be used for improved exhaust gas and reductant mixing.

The embodiment of the exhaust gas aftertreatment device 10d of FIG. 3B is similar to the embodiment of the exhaust gas aftertreatment device of FIG. 3A with the difference that for the embodiment of the exhaust gas aftertreatment device 10d of FIG. 3B a completely impermeable portion 80 is provided in the upstream end of the pipe 60 and the obstructing portion 70 is provided in the downstream part of said pipe 60. The reductant injecting device 50c is provided such that it extends through the encapsulating portion 20c upstream of the first catalytic substrate 30 and through said impermeable portion 80 such that reductant is injectable within said pipe 60 downstream of said impermeable portion 80 but upstream of said obstructing portion 70. Additionally a section of the pipe 60 of the exhaust gas aftertreatment device 10d of FIG. 3B is provided with perforations such that a perforated section 300 is formed.

The embodiment of the present disclosure disclosed in FIG. 3B comprises both an obstructing portion 70 and an impermeable portion 80. Said impermeable portion 80 provides that all exhaust gases entering the exhaust gas aftertreatment device 10d passes at least a portion of the first catalytic substrate 30. According to one embodiment of the present disclosure disclosed in FIG. 3B the obstructing portion 70 is configured such that the backpressure of said obstructing portion 70 is lower than the backpressure of said first catalytic substrate 30. This will provide that exhaust gases will flow from the first catalytic substrate 30, through said perforated section 300 and into said pipe 60.

By controlling the backpressure of said obstructing portion 70 in relation to the backpressure of said first catalytic substrate 30 it is possible to control the flow of exhaust gases through said pipe 60 and said first catalytic substrate 30 respectively in order to optimize catalytic conversion, mixing and evaporation characteristics.

It is also possible to use an obstructing portion, which is not completely impermeable, in the upstream part of the pipe such that the pipe comprises two obstructing portions, one provided in an upstream part of said pipe and one provided in an downstream part of said pipe. For such embodiments of the present disclosure the reductant injecting device may be provided such that reductant is injectable between said obstructing portions such that the backpressure of respective obstructing portion can be used to control the exhaust gas flow and mixing characteristics of said pipe.

Figure 4:
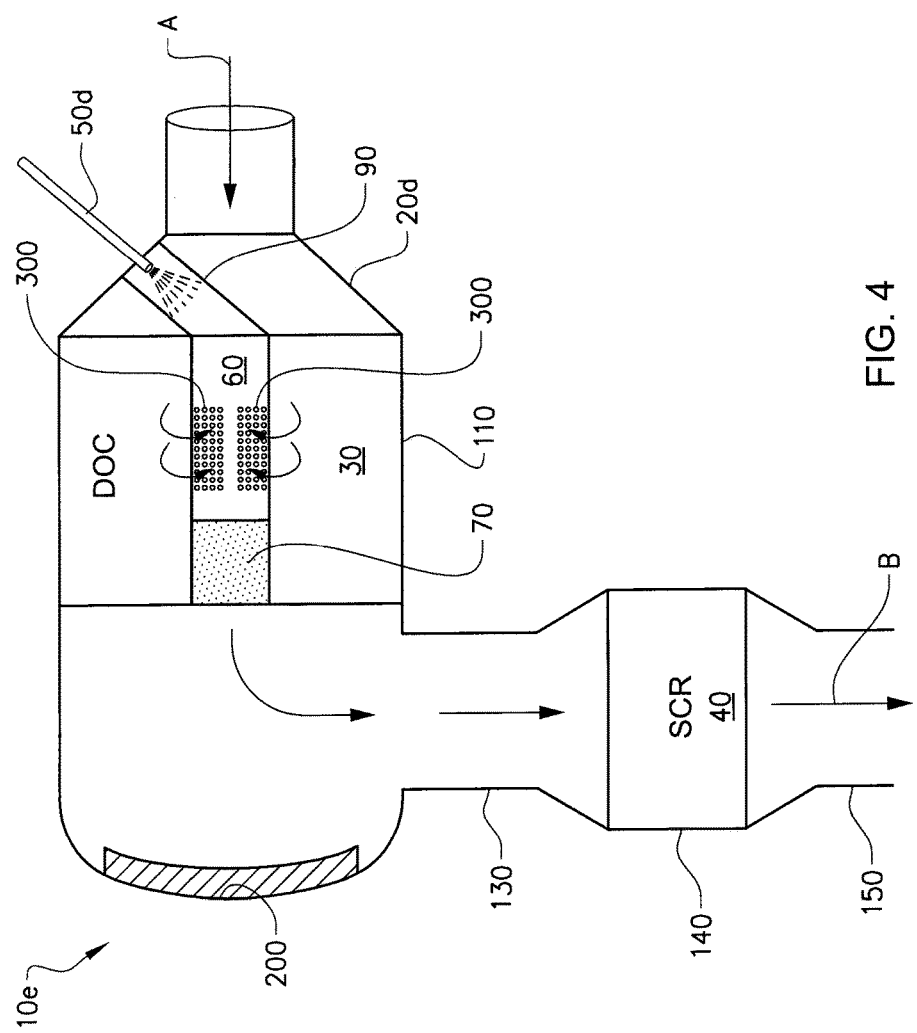
FIG. 4 discloses a third embodiment of an exhaust gas aftertreatment device according to the present disclosure.

Referring now to FIG. 4, disclosing an embodiment of the present disclosure. According to this embodiment of the exhaust gas aftertreatment device 10e the exhaust gas flow enters said exhaust gas aftertreatment device 10e in the first flow direction A. Said first catalytic substrate 30 is provided within the first substrate outer encapsulating portion 110 such that said first catalytic substrate 30 seals against the encapsulating portion 20d. Thus, for such embodiment of the present disclosure no exhaust gas circulating space 160 as of FIGS. 2-3 is provided. After passing said first catalytic substrate or, as will be discussed more in detail later on, the obstructing portion 70, the exhaust gas flow reaches the turnaround surface 200, wherein at said turnaround surface 200 the exhaust gas flow is redirected in the second flow direction B. The mixing area encapsulating portion 130 of the embodiment of the present disclosure disclosed in FIG. 4 is provided such that it extends substantially perpendicular to the first flow direction A. The exemplary design of the exhaust gas aftertreatment device 10e disclosed in FIG. 4 is beneficial from a packaging perspective for some vehicle designs.

Downstream of said mixing area encapsulating portion 130 the second substrate encapsulating portion 140 is provided, wherein said mixing area encapsulating portion 130 is narrower than said second substrate encapsulating portion 140. Such arrangement can be used to improve the mixing characteristics of the exhaust gases before reaching the second catalytic substrate 40. A homogenous mix of exhaust gas and evaporated reductant is beneficial for the catalytic conversion properties of the second catalytic converter 40 of SCR type. Downstream of said second substrate encapsulating portion 140 is the outlet portion 150 arranged, wherein said outlet portion also is narrower than said second substrate encapsulating portion 140.

The reductant injecting device 50d of the embodiment of the present disclosure disclosed in FIG. 4 is provided such that it extends through the encapsulating portion 20, upstream of the first catalytic substrate 30, and into a reductant injecting pipe 90. Said reductant injecting pipe 90 is provided such that it seals against the encapsulating portion 20d and against the upstream edge of the pipe 60. Said reductant injecting device 50d is provided such that reductant is injectable within said reductant pipe 90 in a direction substantially parallel to said reductant pipe 90. Said pipe 60 is provided with an obstructing portion 70, wherein said obstructing portion is provided in the downstream part of said pipe, and a perforated section 300. In accordance to what was discussed in connection to the embodiment of the present disclosure disclosed in FIG. 3B; by controlling the backpressure of the obstructing portion 70 in relation to the backpressure of the first catalytic substrate 30, it is possible to control the flow of exhaust gases passing from the first catalytic substrate 30, trough said perforated section 300, and into said pipe 60.

Figure 5:
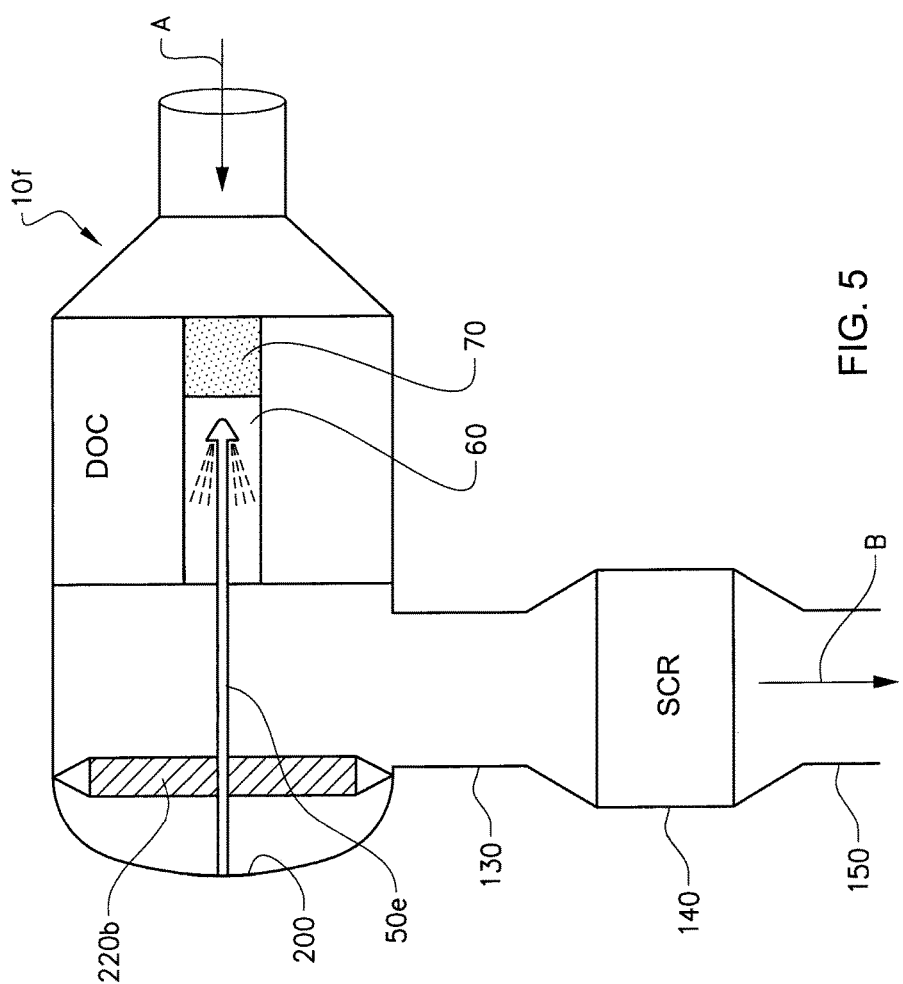
FIG. 5 discloses a fourth embodiment of an exhaust gas aftertreatment device according to the present disclosure.

FIG. 5 discloses another embodiment of an exhaust gas aftertreatment device 10f of the present disclosure comprising a pipe 60 and an obstructing portion 70, wherein said obstructing portion is arranged in the upstream part of said pipe 60. The embodiment of the present disclosure shown in FIG. 5 is provided in order to disclose an alternative embodiment of a porous material 220b and an alternative embodiment of a reductant injecting device 50e. The arrangement of porous material, reductant injecting device, mixing area/encapsulating portion/second substrate encapsulating portion 130, 140, 150 can be used in order to tune the mixing and reductant evaporation characteristics of exhaust gas aftertreatment devices according to the present disclosure.

Said reductant injecting device 50e is provided such that it extends through the turnaround surface 200 and into said pipe 60, such that reductant is injectable within said pipe 60 at a position downstream said obstructing portion 70. Further, the injection nozzle of said reductant obstructing device 50e is provided such that reductant is injectable substantially in the first flow direction A. Said porous material 220b of the embodiment of the exhaust gas aftertreatment device 10f disclosed in FIG. 5 is provided at a distance from said turnaround surface 200 such that an open space is provided between said turnaround surface and said porous material 22b.

The mixing area/encapsulating portion/second substrate encapsulating portion 130, 140, 150 of the embodiment of the disclosure disclosed in FIG. 5 is arranged according to the arrangement disclosed in FIG. 4.

Depending on current design of the exhaust gas aftertreatment device arranging said porous material 220b, said reductant injecting device 50e and said mixing area/encapsulating portion/second substrate encapsulating portion 130, 140, 150 according to the embodiment of the present disclosure shown in FIG. 5 may be beneficial.

It is to be understood that the present disclosure is not limited to the embodiments described above and illustrated in the drawings; rather, the skilled person will recognize that many changes and modifications may be made within the scope of the appended claims.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An exhaust gas aftertreatment device for purification of exhaust gas emissions, the exhaust gas aftertreatment device for arrangement in an exhaust gas passage subsequently of an internal combustion engine, and for enclosure by an encapsulating portion of the exhaust gas passage, the exhaust gas aftertreatment device comprising:
   a first catalytic substrate and a second catalytic substrate, the first catalytic substrate for arrangement upstream of the second catalytic substrate, the first and second catalytic substrates for arrangement such that a respective catalytic substrate covers a majority of a respective flow cross sectional area of the exhaust gas passage, and the first and second catalytic substrates for arrangement to extend a respective length in a flow direction of the exhaust gas passage;
   a reductant injecting device; and
   a pipe for arrangement in the flow direction of the first catalytic substrate such that the pipe provides a passage through the first catalytic substrate, the pipe comprising an obstructing portion for arrangement such that the obstructing portion covers a cross sectional area of the pipe such that a difference in back pressure is obtainable between the pipe and the first catalytic substrate, wherein the reductant injecting device is configured to extend through the encapsulating portion upstream of the first catalytic substrate, and through the obstructing portion and into the pipe, such that reductant is injectable within the pipe and downstream of the obstructing portion.

2. An exhaust gas aftertreatment device according to claim 1 wherein the obstructing portion creates a higher back pressure than the first catalytic substrate.

3. An exhaust gas aftertreatment device according to claim 1 wherein the exhaust gas flow enters the exhaust gas aftertreatment device in a first flow direction (A) and is discharged from the exhaust gas aftertreatment device in a second flow direction (B), and the reductant injecting device is configured such that the reductant is injectable substantially in the first flow direction.

4. An exhaust gas aftertreatment device according to claim 3 wherein the encapsulating portion comprises, in the order of the exhaust gas flow:
   an inlet portion;
   a first substrate outer encapsulating portion;
   a turnaround surface portion;
   a mixing area encapsulating portion;
   a second substrate encapsulating portion; and
   an outlet portion;
   wherein the exhaust gas flow enters the exhaust gas aftertreatment device at the inlet portion in the first flow direction and is discharged from the exhaust gas aftertreatment device at the outlet portion in the second flow direction, and wherein the turnaround surface portion provides a turnaround surface between the first catalytic substrate and the second catalytic substrate such that the exhaust gas flow is redirected from the first flow direction to the second flow direction.

5. A vehicle comprising the exhaust gas aftertreatment device according to claim 1.

* * * * *